T. J. MULLEN & T. F. BRENNAN.
SHOCK ABSORBER.
APPLICATION FILED JULY 19, 1911.
1,049,512.
Patented Jan. 7, 1913.
4 SHEETS—SHEET 1.
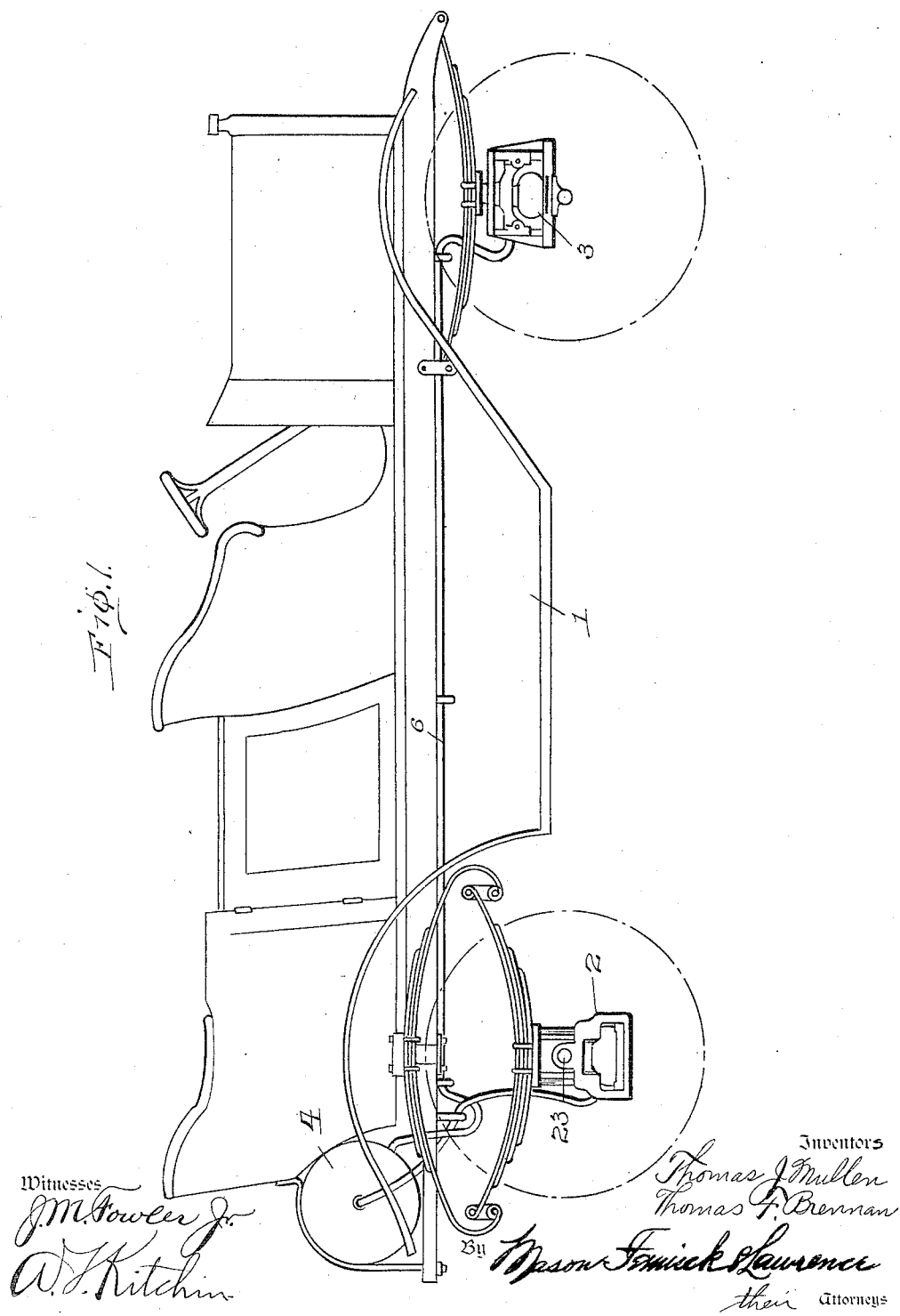

T. J. MULLEN & T. F. BRENNAN.
SHOCK ABSORBER.
APPLICATION FILED JULY 19, 1911.
1,049,512.
Patented Jan. 7, 1913.
4 SHEETS—SHEET 2.
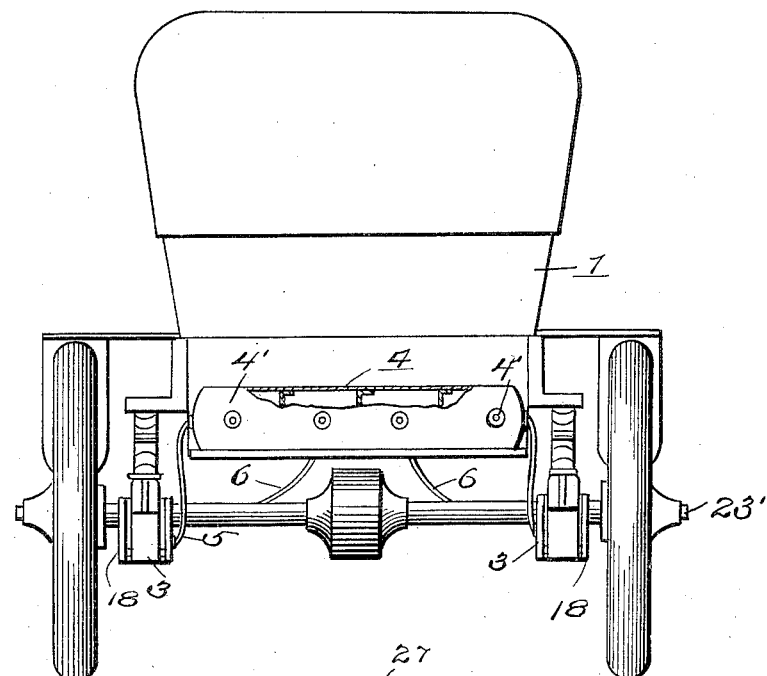
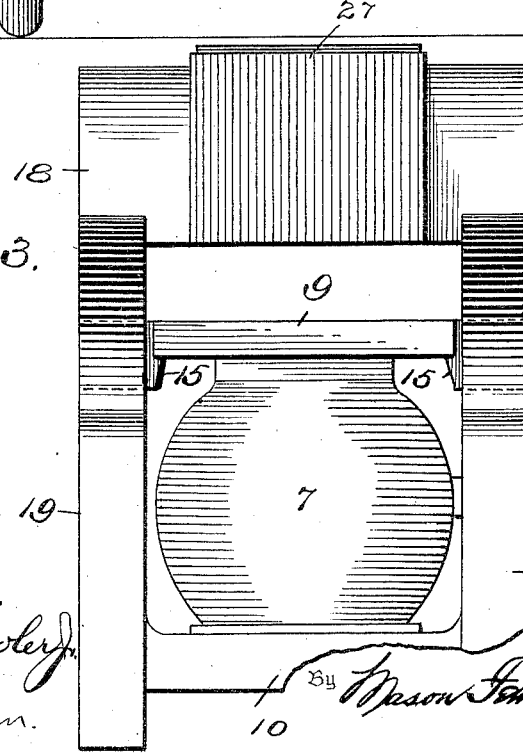

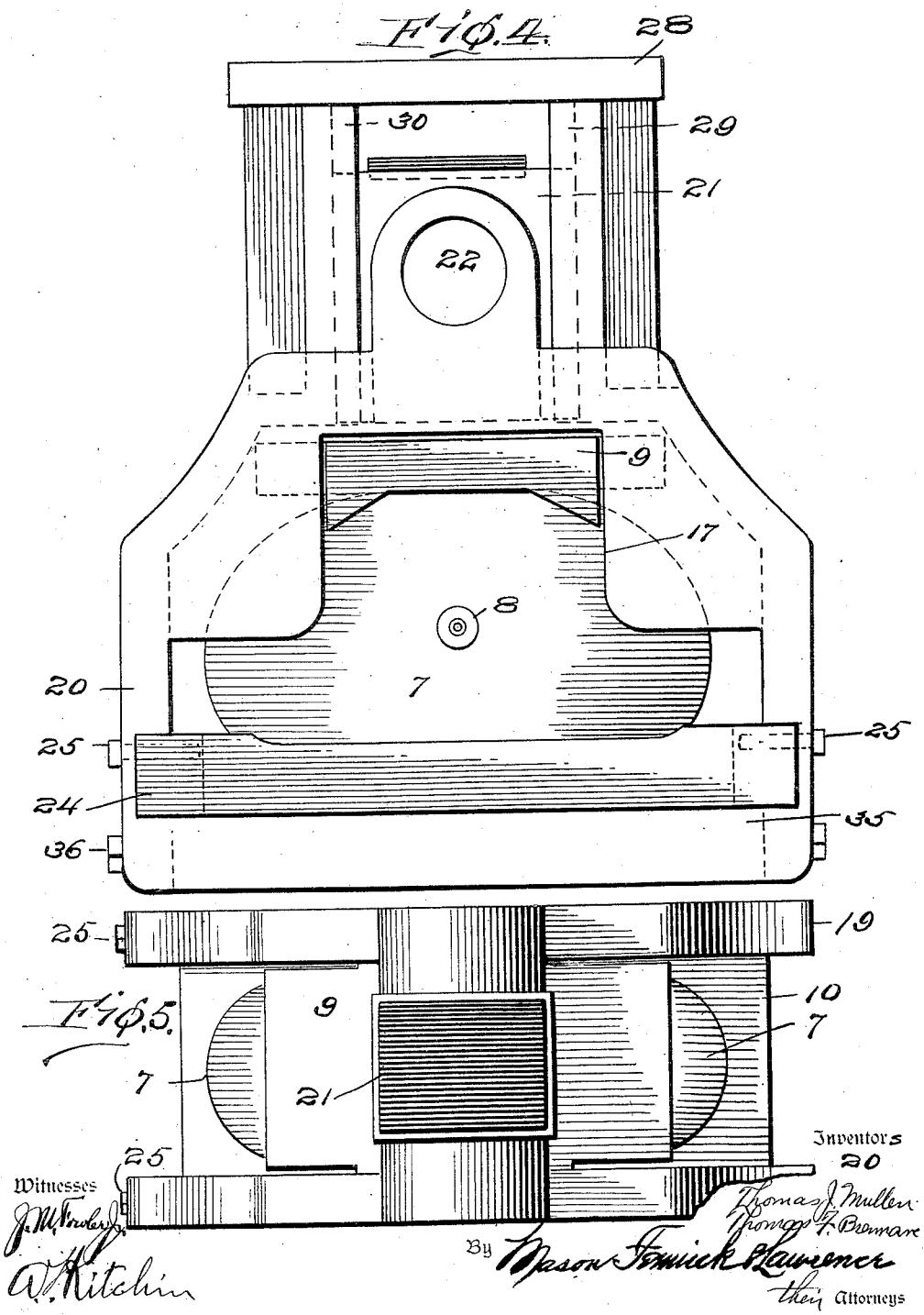

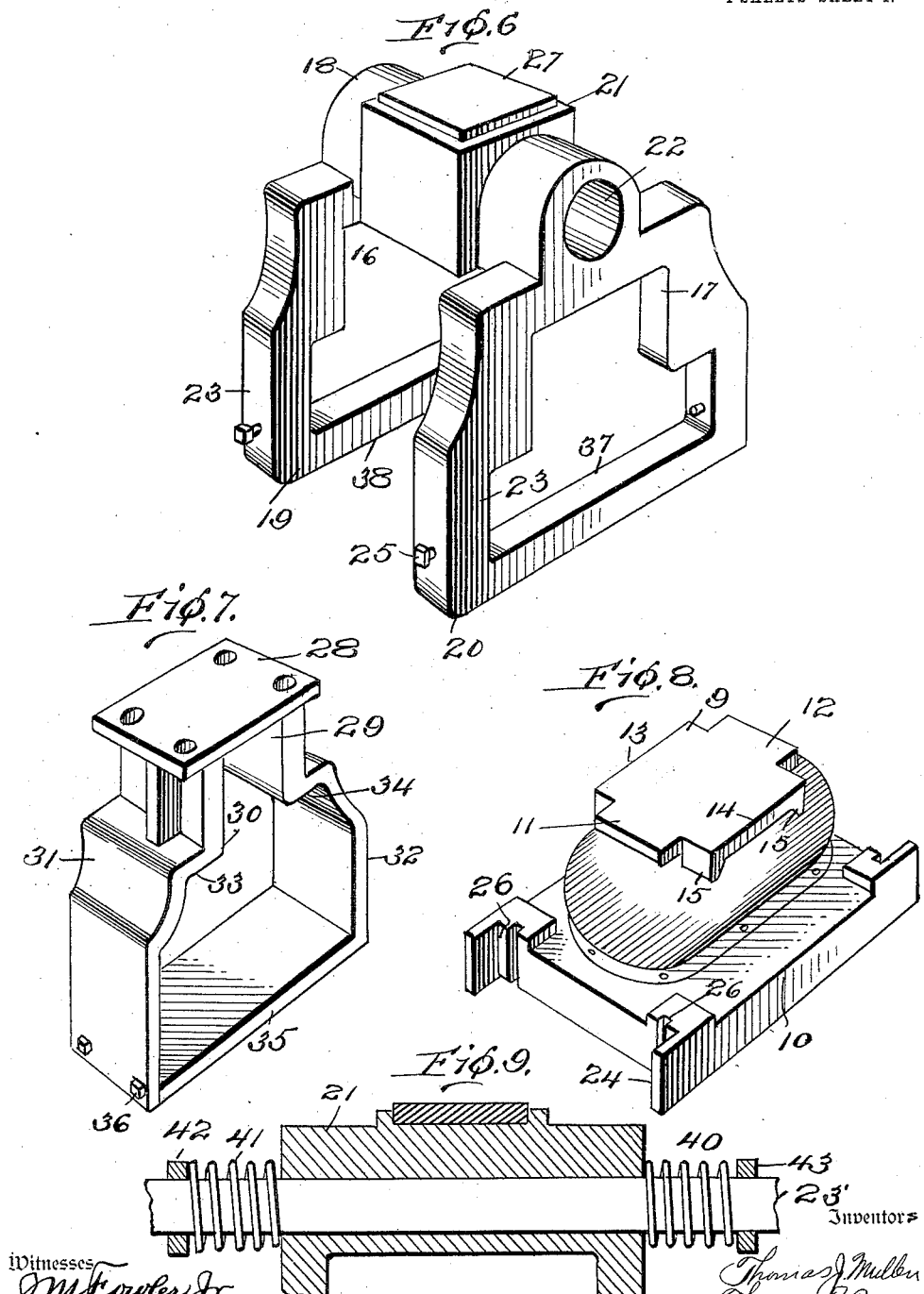

UNITED STATES PATENT OFFICE.

THOMAS J. MULLEN AND THOMAS F. BRENNAN, OF NEW BRIGHTON, NEW YORK.

SHOCK-ABSORBER.

1,049,512.   Specification of Letters Patent.   Patented Jan. 7, 1913.

Application filed July 19, 1911. Serial No. 639,315.

*To all whom it may concern:*

Be it known that we, THOMAS J. MULLEN and THOMAS F. BRENNAN, citizens of the United States, residing at New Brighton, in the county of Richmond and State of New York, have invented certain new and useful Improvements in Shock-Absorbers; and we do hereby declare the following to be a full, clear, and exact description of the invention, such as will enable others skilled in the art to which it appertains to make and use the same.

This invention relates to pneumatic springs for vehicles for use especially with automobiles, and has for an object the arrangement of improved means for utilizing the cushion and resilient effect of a pneumatic bag.

A further object of the invention is the arrangement of improved means interposed between the running gear and body of a vehicle for utilizing the effect of a pneumatic bag for absorbing shocks and for absorbing and limiting the rebound.

A still further object of the invention is the arrangement in a pneumatic shock absorber positioned between the body of a vehicle and the running gear, of sliding guiding members for permitting a free up and down movement of the movable parts limited only by the action of the pneumatic bag, the limiting by said bag being in both directions for absorbing the downward shock and the rebound.

With these and other objects in view the invention comprises certain novel constructions, combinations, and arrangement of parts as will be hereinafter more fully described and claimed.

In the accompanying drawings: Figure 1 is a side view of an automobile with an embodiment of the invention applied thereto. Fig. 2 is a rear view of the structure shown in Fig. 1. Fig. 3 is an enlarged edge view of a swinging frame and associated parts embodying certain features of the invention. Fig. 4 is an enlarged side view of a complete structure. Fig. 5 is a top plan view of the structure shown in Fig. 3. Fig. 6 is a detail perspective view of the swinging frame. Fig. 7 is a detail perspective view of the sliding frame. Fig. 8 is a perspective view of the bag carrying members. Fig. 9 is a detail fragmentary view showing the absorber in side elevation, and disclosing a side cushion or side rebound means.

In constructing a shock absorber embodying the invention a pneumatic bag is provided associated with a plurality of sliding and swinging parts either connected with a car body or with the bag in some manner for acting together, and for causing the bag to absorb shocks not only from unevenness of the road but to absorb the rebound after the original shock. To this end the pneumatic bag is connected with an upper and lower sliding or movable plate, which plates are mounted in a swinging frame and adapted to move or reciprocate therein. One of these plates is designed to compress the bag for absorbing shocks, and then to move back to its original position. After this has occurred the lower or other plate is pulled upward against the bag, and somewhat compresses the same, whereby the bag absorbs the rebound.

In order that the invention may be more clearly understood an embodiment of the same is shown in the accompanying drawings in which 1 indicates an automobile of any desired kind to which is secured a shock absorber 2 embodying the invention. Also connected with the automobile 1 is a shock absorber 3 constructed in any desired way, preferably as disclosed in an application co-pending herewith. If desired, of course, a shock absorber similar to shock absorber 2 might be used instead of shock absorber 3. Both of the shock absorbers 2 and 3 are connected to an air tank 4 by suitable pipes or tubes 5 and 6. The tank 4 is preferably divided into sections, one section being for each of the shock absorbers so that if there are four shock absorbers on a given vehicle there will be four sections in tank 4, and also four pipes or tubes for conveying air or causing communication of air between the respective sections of tank 4 and the respective shock absorbers. By the arrangement of the air tank 4 and the pipes or tubes connecting the same with the air bags of the respective shock absorbers means are provided for utilizing the effect of a comparatively large volume of air between the car body and the axle, so as to multiply the resilient effect of the air.

The shock absorber 2 is shown in detail in Figs. 3 to 7 inclusive from which it will be observed that the absorber is formed with an air bag 7. This air bag may be of any desired kind and is provided with a suitable coupling 8 connecting the same with one of the pipes leading to the tank 4. Of course if desired the tank 4 could be eliminated and the coupling 8 changed into an ordinary inlet air valve so that the only air used would be in the bag 7. Bag 7 is connected in any desired manner to a pair of reciprocating guide plates 9 and 10. The guide plate 9 is provided with extending end portions 11 and 12 for engaging a larger area of the bag 7 when a shock is being absorbed. The plate 9 is also formed with guiding projections 13 and 14 each of which is formed with suitable depending members 15. The plate 9 is arranged on top of bag 7 and adapted to reciprocate in ways 16 and 17 of the swinging frame 18. Frame 18 is provided with side members 19 and 20 and a connecting combined journal and bearing member 21. The combined bearing and journal member 21 is provided with an aperture 22 which accommodates the axle 23' of the automobile 1. Of course the absorber may be used upon any desired vehicle, but the automobile 1 is disclosed simply to show the device applied. Connected with the lower part of the bag 7 is a plate 10 which is guided by upright portions 23 of members 19 and 20 and the flanges 24 projecting from the plate. In order to assist the movement of the flanges 24 and guiding plate 10 a plurality of bolts 25 project through the portions 23 and into slots 26 of plate 10. If found desirable the flanges 24 might be eliminated or the bolts 25 might be eliminated. By this construction and arrangement any downward pressure upon plate 9 will be resiliently resisted by bag 7 and any upward pressure on plate 10 will be resiliently resisted by the same bag.

It will be noted that the construction just described is disclosed in Fig. 8 and is adapted to fit into the swinging frame 18 disclosed in Fig. 6. Also the structure shown in Fig. 7 is designed to fit over the squared portion 27 of the combined member 21, and to press against plate 9 and also act against plate 10. The sliding member 28 disclosed in Fig. 7 is formed with a way 29 for fitting over the squared portion 27. Way 29 is formed with flanges 30 for guiding the member 28 in its reciprocatory movement. The sliding member 28 is formed with sides 31 and 32, each of which is formed with squared portions 33 and 34 which are adapted to normally rest against the top of plate 9 and engage especially the projections 11 and 12. The sides 31 and 32 are arranged to extend below plate 10 and to have connected therewith a cross bar 35. Cross bar 35 may be connected to the sides 31 and 32 in any desired way, as for instance by bolts 36. By this construction and arrangement when there is a shock encountered the squared portions 33 and 34 will press downward against plate 9 and on the rebound the cross bar 35 will press upwardly against plate 10. Plate 10 normally rests upon the cross bars 37 and 38 forming part of members 19 and 20 so that when the bag 7 is pressed by the downward movement of plate 9 pressure will be conveyed to the swinging frame 18 and from thence to the axle 23'. Any upward movement of sliding member 28 independent of axle 23' will cause an upward pull upon cross bar 35 and consequently will move plate 10 upward and press bag 7. As plate 10 moves upward and presses bag 7 plate 9 will move upward to the upper end of the ways 16 and 17 if not already at that position. Reciprocating or sliding member 28 is rigidly connected with the body of the automobile 1, or with the springs if desired. Stirrups or other devices may be used for receiving the springs of the vehicle for connecting the member 28 to the body of the vehicle. It also will be evident that the shock absorbers 2 and 3 may be connected with the body of the vehicle directly and may be associated together as shown in Fig. 1 or may be used independently. Either when using all four shock absorbers formed as disclosed by the shock absorber 2, or by the shock absorber 3, the same may be associated with air tank 4 for utilizing the effect of a large volume of air under compression. By dividing the tank 4 into compartments it will prevent the loss of the volume of air utilized for all of the shock absorbers. In case one of the compartments of tank 4 should lose its air the same may be again supplied with air through a suitable valve 4', or if desired the pipe connecting any particular shock absorber 2 may be disconnected therefrom and the air bag thereof pumped full of air and a suitable valve supplied directly to the bag for maintaining the air in the valve. From this it will be noted that the respective shock absorbers may be used either with or without the tank 4 and also with or without the usual springs.

In Fig. 9 are disclosed a pair of springs 40 and 41 pressing against the sides of the frame 18. These springs surround axle 23'. A pair of stops 42 and 43 are provided for limiting the movement of springs 40 and 41, the same being held in place by suitable set screws. It will be evident that the compression of springs 40 and 41 may be varied as occasion may demand by shifting members 42 and 43. By this structure any lateral or side movement of the vehicle will be resiliently resisted without in any way affecting the proper operation of the air bag and associated parts.

What we claim is:

1. A shock absorber comprising an air bag, a supporting frame therefor, a pressure member sliding over said supporting frame and adapted to reciprocate thereover, said pressure member being formed with a pair of shoulders near the upper end and a cross member at the bottom, means loosely mounted upon said supporting frame for supporting said air bag on said frame, said loosely mounted means being arranged in the path of movement of the cross bar of said pressure member, whereby an upward movement of the pressure member is cushioned, and a pressure plate mounted on the upper side of said air bag and arranged to engage the shoulders of said pressure member, whereby downward pressure on said pressure member will be transmitted to said air bag.

2. In a shock absorber for vehicles, and the like, a swinging supporting frame, an upper plate loosely mounted in said frame and designed to press against the under surface of the upper part of said frame under certain conditions, a lower plate mounted in said frame and designed normally to press against the lower part of said frame, an air bag arranged between said plates, and a reciprocating pressure member connected with the body of said vehicle substantially surrounding said air bag and said plates, said pressure member being designed to normally rest on said upper plate, whereby shocks from said body will be absorbed by said air bag, and rebounds will be absorbed by said air bag through said lower plate, the lower part of said reciprocating pressure member engaging said lower plate and raising the same.

3. In a shock absorber for vehicles, a swinging supporting frame mounted on the axle of said vehicle, a pressure member connected to the body of said vehicle and sliding over said frame, said pressure member being formed with a pair of shoulders near the upper end and a cross member at the bottom, an air bag being interposed between said pressure member and said supporting frame for taking up the shock, and means engaging said bottom member for connecting said pressure member to the bottom of said air bag, for causing the air bag to take up the rebound.

4. In a shock absorber for vehicles, a swinging frame arranged on the axle thereof, a reciprocating pressure member fitting over said frame and connected with the body of said vehicle, an air bag, a plate for supporting the air bag on said swinging frame, a second plate engaging said air bag and said reciprocating pressure member for transmitting pressure from said pressure member to said bag, said reciprocating pressure member being also arranged to engage said first mentioned plate for causing the rebound of said reciprocating pressure member and the rebound of the body of said vehicle to be taken up by said air bag.

5. In a shock absorber for vehicles, a swinging supporting frame connected with the axle of the vehicle, an upper plate mounted in said frame and designed to press against the end surface of the upper part of said frame, a lower plate mounted in said frame designed to press against the lower part of said frame, an air bag between the said plates and a reciprocating pressure member connected with the body of said vehicle adapted to press against the said air bag in one direction when a shock is to be absorbed and in the opposite direction, when a rebound is to be absorbed.

6. In a shock absorber for vehicles, a supporting frame connected with each axle of said vehicle, said frame being formed with a plurality of guide ways therein, a pair of bodily sliding plates arranged to move in said guide ways, an air cushion arranged between said plates and normally holding said plates in their extreme positions, and a reciprocating pressure member connected with the body of said vehicle and formed with means for pressing against one plate when a shock is to be absorbed, and against the opposite plate when a rebound is to be absorbed.

7. In a shock absorber for vehicles, a frame connected with the axle of said vehicle, an upper plate adapted to reciprocate in said frame, a lower plate formed with flanges extending on each side and parallel with said frame, an air cushion arranged between said plates and adapted to be compressed by a movement of either of said plates, and a reciprocating frame connected with the body of said vehicle formed with an offset portion near one end for engaging the upper plate and acting thereon, and a cross bar connecting the lower part of said reciprocating frame and engaging said lower plate for acting thereon, whereby a downward movement of the reciprocating pressure member and also an upward movement thereof will compress said air cushion and resiliently resist movement by said reciprocating pressure member.

In testimony whereof we affix our signatures in presence of two witnesses.

THOMAS J. MULLEN.
THOMAS F. BRENNAN.

Witnesses:
J. H. SEARLE,
FRANK J. MULLEN.

---

Copies of this patent may be obtained for five cents each, by addressing the "Commissioner of Patents, Washington, D. C."